INVENTOR.
JAKOB WAGNER
BY Karl G. Ross
ATTORNEY

United States Patent Office 3,554,849
Patented Jan. 12, 1971

3,554,849
AUTOMOTIVE VEHICLE WITH AUXILIARY
MOTIVE-POWER SOURCE
Jakob Wagner, Mainz-Kastel, Germany, assignor to Linde Aktiengesellschaft, Wiesbaden, Germany, a corporation of Germany
Filed Dec. 16, 1968, Ser. No. 784,037
Claims priority, application Germany, Dec. 21, 1967, 1,601,457
Int. Cl. B60h 3/04
U.S. Cl. 165—23    10 Claims

ABSTRACT OF THE DISCLOSURE

An automotive vehicle has an auxiliary power source comprising a cold-vapor engine running off the normally wasted heat of the exhaust gas and/or of the lubricant as generated by its internal-combustion engine. This cold-vapor engine converts the abstracted heat into mechanical work which is used to run the vehicular cooling, air-conditioning or other system. The cold-vapor fluid used for this auxiliary power source is a refrigerant which is preheated in a coil in the motor oil and further heated by the exhaust gas prior to driving an expansion engine, e.g. a rotary displacement-type motor.

My present invention relates to an automotive vehicle and, more particularly, to an auxiliary source of motive power for a vehicle with an internal-combustion engine.

BACKGROUND OF THE INVENTION

An automotive vehicle with an internal-combustion engine usually drives directly such loads as the lubrication system, the cooling system, the generator or alternator, and the air conditioning. This power is generally tapped off the drive shaft of the engine.

Directly utilizing the engine's power in this manner gives rise to several disadvantages. First of all, an engine of increased horsepower must be provided to be able to do all this work. Furthermore, extra fuel is consumed by the engine for these secondary tasks.

A further disadvantage is that systems such as the cooling and lubrication arrangements invariably operate as a function of the rotational speed of the drive shaft and not necessarily as a function of the requirements for cooling and lubrication.

In the case of an engine turning over slowly to pull a vehicle up a slope, for example, the need for lubrication and cooling is great although the engine speed is quite low. Here, a conventional cooling and lubrication system would also be slowed down. In addition, in an engine which has just started and is still running cool, little lubrication or cooling is necessary and excessive cooling is disadvantageous.

OBJECTS OF THE INVENTION

Consequently, it is one of the principal objects of my invention to provide a vehicle system which overcomes these and other disadvantages.

A further object is to provide an auxiliary motive-power source which does not drain any appreciable amount of the engine's motive power output thereby allowing the engine's full power to be used for driving the vehicle.

A further object is to provide such a power source which is adaptable to drive the cooling system of an automotive vehicle and which does not work solely as a function of engine rotational speed, but as a function of the engine's need for cooling.

SUMMARY OF THE INVENTION

My invention makes use of the waste heat of the hot exhaust gas and/or of the engine lubricant of an internal-combustion engine to generate motive power. This hot gas is generally expelled into the ambient air thereby wasting all its potential energy in the form of heat while complicated installations are provided to cool the oil.

A thermomechanical transducer in the form of a cold-vapor engine is provided to do this. It has a heat exchanger or evaporator exposed to the hot exhaust gas in an exhaust duct or manifold. The outlet side of this heat-exchanger/vaporizer is connected through a high-pressure vapor conduit to the inlet of a vapor-driven "expansion" motor, such as a rotary displacement-type motor e.g. a rotary-piston motor. The outlet of this vapor-driven motor is connected through a conduit of larger diameter to the upper inlet of a condenser in which the low-pressure vapor issuing from the vapor driven motor is liquefied. A valve is provided in this large-diameter low-pressure conduit. A lower liquid outlet of the condenser is connected through a small-diameter conduit and a valve to the inlet of the heat exchanger/vaporizer to feed the liquid directly from the condenser to the latter for filling the vaporizer after standstill. The stepped diameters of the conduits along with location of the condenser above the heat exchanger makes for a natural expansion and flow through them in the system.

Coupling such a cold-vapor engine to the exhaust manifold or duct of an internal-combustion engine makes for the extremely advantageous feature that systems run by this cold-vapor engine work as a function of the temperature of the exhaust gas which is obviously more closely related to the engine requirements for cooling and lubrication than the rotation speed of this engine.

A further feature of my invention arises from the provision of a preheating exchanger coil or vaporizer in the motor oil before the main heat exchanger. This serves the double function of cooling the oil and preheating the refrigerant in the coil. In addition, through proper setting of the valves, a closed circuit of condenser and this motor-oil cooling coil can be established to cool this oil under all circumstances, e.g., when the cold-vapor engine is cut off so as to have no mechanical output or when the vehicle is stopped. A temperature-responsive valve can be provided to shunt this coil out if the oil needs no cooling.

The exhaust duct has two branches in one of which the main heat exchanger/vaporizer is mounted. A small flap, serving as a valve means, can close one or the other of the branches to divert the hot exhaust gas either partially or fully through one or the other of the branches. This allows for control of the amount of heat energy transformed into mechanical energy and therewith control of the rotation speed of the cold-vapor engine.

A further advantage of my invention is that there is no need to arrange this auxiliary power source near the drive shaft. It can be placed wherever convenient in construction of the vehicle, with small lines connecting the heat exchanger/vaporizer to the vapor-driven motor and the condenser of the cold-vapor engine. In addition, a very small vapor-driven engine for maximum efficiency and minimum waste of space.

BRIEF DESCRIPTION OF THE FIGURES

The foregoing and other objects, features and advantages of my invention will become more readily apparent from the following description, with reference to the drawing in which.

SPECIFIC DESCRIPTION

Figure 1:
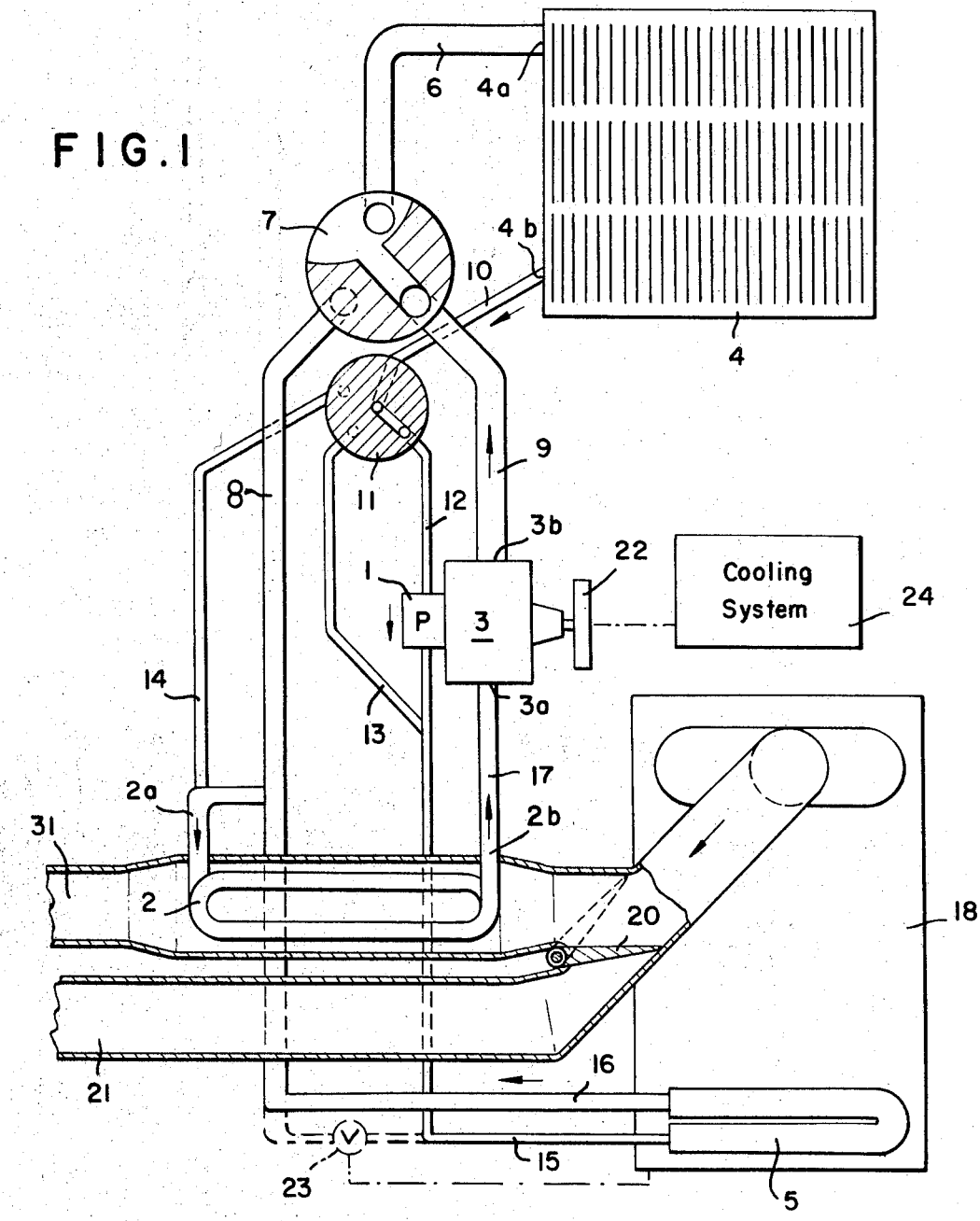
FIG. 1 is a largely diagrammatic representation of an auxiliary power source according to my invention.

FIG. 1 shows an internal-combustion motor-vehicle engine 18 with an exhaust duct 19 divided into two branches 31 and 21 through which hot exhaust gas passes controlled by an adjustable pivotal flap 20.

A heat exchanger/vaporizer 2 is mounted in this branch 31. It comprises basically a set of conductive coils of tubing externally exposed to the hot gas and internally carrying a refrigerant. Here the refrigerant (e.g. a Freon) is one which remains liquid at ambient temperatures, but which vaporizes at the temperature of the gas in duct 19 without decomposing, i.e. the boiling point of the liquid is less than the normal operating temperature of the engine oil or the normal exhaust-gas temperature.

This exchanger/vaporizer 2 has an inlet 2a which can be connected through a relatively small-diameter liquid conduit comprising a tube 14, a valve 11, and a tube 10 to an outlet of a condenser 4 as described in the above-cited reference work. This outlet 4b is the liquid outlet of the condenser 4 and is advantageously located above the exchanger/vaporizer 2 to ensure flow therebetween.

An outlet 2b of the exchanger 2 is connected to an inlet 3a of a vapor-driven motor, for instance a rotary-piston motor, through a medium-diameter high-pressure vapor conduit 17. An outlet 3b of the vapor-driven motor 3 is connected through a large-diameter low-pressure conduit comprising here a tube 9, a valve 7 and a pipe 6 to an inlet of the condenser 4.

A cooling coil 5, also serving as a preheating/vaporizer coil, is provided in the lubrication oil of the engine 18 to cool same. Its outlet line 16 is connected to the inlet 2a of the exchanger 2. A temperature-responsive valve 23 may be provided to connect an inlet line 16 of the coil 5 to the line 16 when the oil in the engine 18 is cooler than a desired minimum operating temperature.

The inlet line 15 of the coil 5 is connected to a pump 1 coupled to the vapor-driven motor 3 and to a line 13 connected to the valve 11. A line 12 connects the other side of the pump 12 to the valve 11.

The vapor-driven motor 3, which serves as the mechanical output of the cold-vapor engine, has a flywheel 22 which rotates and can be connected to a cooling system 24 of a motor vehicle.

Figure 2:
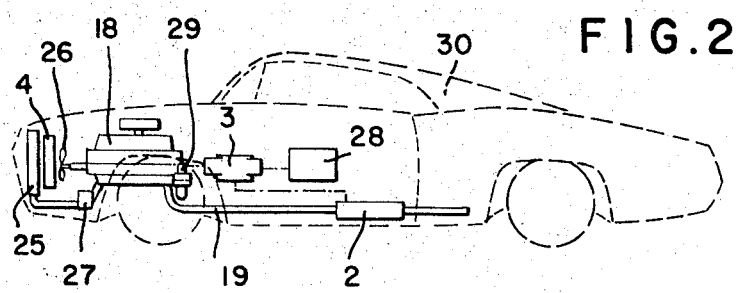
FIG. 2 is a view showing the mounting of my invention in an automotive vehicle.

FIG. 2 shows a motor vehicle 30 with an air-conditioner 28, a water pump 27, a hydraulic pump 29 for operating auxiliary equipment and a cooling fan 26 all powered by the vapor-driven motor 3 of my invention. The motor-vehicle cooling radiator is shown at 25, this is cooled by air displaced by the fan 26. The vehicle 30 forms a mobile body on which all parts of the system described above can be mounted, although my system is equally applicable to air and water craft.

OPERATION

On starting the engine 18, the flap 20 is moved to the position illustrated in solid lines, the valve 7 is moved to the illustrated position, and the valve 11 is actuated to connect the line 10 to the line 14. This allows the exchanger/vaporizer 2 to fill with refrigerant which is subjected to the heat of the hot exhaust gas passing through the branch 31.

On build-up of heat in the engine 18, the valve 11 is switched to its illustrated position. By this time, the refrigerant is vaporizing and thereby forming a high-pressure vapor which serves to drive the vapor driven motor 3. This in turn sets the pump 12 in action to pump liquefied refrigerant from the condenser 4 into the line 15.

As long as the motor-oil temperature is below a certain minimum temperature, a valve 23 shunts the liquid from line 15 to line 16 and therefore directly into the inlet 2a of the heat exchanger 2. Thus a complete circuit of heat exchanger 2, vapor-driven motor 3, condenser 4 and pump 1 is formed.

Once the oil temperature rises above the predetermined minimum, the valve opens and the refrigerant flows through the cooling coil 5 thereby putting the whole system in operational position. This serves to prewarm the refrigerant before it enters the heat exchanger/vaporizer 2, thereby making it easier to vaporize, while cooling this oil. Thus, the coil 5 is switched into the liquid conduit of the system. The cooling system 24 connected to the vapor-driven motor 3 now tends to cool the engine 18 as a function of its heat, rather than its revolutions. The flap 20 can be left more or less ajar to prevent too much energy conversion, if desired and thereby to vary the rotational speed of the motor 3.

In case, for some reason, the vapor-driven motor 3 is stopped, thereby arresting the pump 1, the valve 11 is rotated to connect the tube 10 to the tube 13 and thereby bypass it. At the same time, the valve 7 can be rotated to connect the pipe 6 with the pipe 8 while the door or flap 20 can be moved to the position illustrated by the dot-dash line. Normal thermal convection in the circuit of coil 5 to condenser 4 and back again keeps the lubrication oil cooled to a certain extent.

On stopping of the engine 18, the entire system can be left in the operational position to operate as long as there is heat to remain. This is extremely useful for vehicles on summer days when they are stopped for brief periods of time which do not permit proper cooling of the engine. With my invention, the entire engine cooling system remains functional as long as the engine is hot, even though this engine has been stopped.

The improvement described and illustrated is believed to admit of many modifications within the ability of persons skilled in the art, all such modifictaions being considered within the spirit and scope of the invention except as limited by the appended claims.

I claim:

1. An automotive vehicle, comprising:
    a mobile body;
    an internal-combustion engine on said body for driving same while producing waste heat;
    thermomechanical-transducer means for transforming the heat of said engine into mechanical motive power, said thermomechanical-transducer means having a thermal input abstracting heat from said engine and a mechanical output; and
    a mechanically drivable load on said body connected to said output for operation thereby at a rate determined by the heat generated by said engine but otherwise independent of the rate of operation of the engine, said thermomechanical-transducer means including a cold-vapor engine and said input including heat-exchanger means coupled with said internal-combustion engine for abstracting heat therefrom and having a liquid inlet and an outlet for an expandable fluid, and said output including a vapor-driven motor having a high-pressure inlet and a low-pressure outlet, said cold-vapor engine further comprising:
        a high-pressure conduit connecting the outlet of said heat-exchanger means to said inlet of said motor;
        a condenser having a low-pressure vapor inlet and a liquid outlet;
        a low-pressure conduit connecting said vapor outlet of said motor to said low-pressure vapor inlet of said condenser;
        a liquid conduit connecting said liquid outlet of said condenser to said liquid inlet of said heat-exchanger means; and
        pump means in said liquid conduit for displacing liquid therethrough from said condenser to said heat-exchanger means, said pump means being operatively connected to said motor, said internal-combustion engine further comprising a lubrication system containing a hot lubricant, said heat-exchanger means being at least partly mounted in said lubrication system for cooling said lubricant and abstracting heat therefrom.

2. The automotive vehicle defined in claim 1 wherein said internal-combustion engine comprises an exhaust duct for discharging hot exhaust gas produced thereby, said heat-exchanger means being at least partly mounted in said duct in heat-exchanging relationship with said gas.

3. The automotive vehicle defined in claim 2, further comprising valve means for controlling the flow of said hot exhaust gas through said duct.

4. The automotive vehicle defined in claim 1 wherein said heat-exchanger means has an inlet side and an outlet side, said cold-vapor engine further comprising a valve operable to connect said outlet side of said heat-exchanger directly to said low-pressure inlet of said condenser.

5. An automotive vehicle defined in claim 4, further comprising a temperature-responsive valve connected in shunt across said inlet and said outlet side of said heat-exchanger means, said valve responding to engine temperature.

6. The automotive vehicle defined in claim 1 wherein said internal-combustion engine has a duct for discharging hot exhaust gas produced thereby, said heat-exchanger means including a preheating exchanger for said liquid in heat-exchanging relation with said lubricant adapted to vaporize said liquid, and a vapor-heating exchanger connected to said preheating exchanger for passing the vapor produced by said preheating exchanger in heat-exchanging relation with said hot exhaust gas.

7. The vehicle defined in claim 6 wherein said load includes a cooling system for said internal-combustion engine.

8. The vehicle defined in claim 6 wherein said load includes an air-conditioning system for said vehicle.

9. The vehicle defined in claim 6 wherein said load includes a fluid-circulating pump for said vehicle.

10. The automotive vehicle defined in claim 1 wherein said liquid is a refrigerant having a boiling point higher than ambient temperature and less than the normal operating temperature of the engine lubricant, said vehicle further comprising:

an exhaust duct on said internal-combustion engine for discharging hot exhaust gas therefrom, said heat-exchanger means including a first heat exchanger at least partly mounted in said duct; and valve means in said duct for controlling the flow of said hot exhaust gas through said duct.

References Cited
UNITED STATES PATENTS

| | | | |
|---|---|---|---|
| 1,871,244 | 8/1932 | Steuart | 62—238 |
| 2,783,622 | 3/1957 | Bourassa | 165—43 |
| 2,952,138 | 9/1960 | Russell et al. | 62—238 |
| 3,181,308 | 5/1965 | Hagen | 62—238 |

CHARLES SUKALO, Primary Examiner

U.S. Cl. X.R.

165—51; 62—238